United States Patent [19]

Kato

[11] 4,402,024
[45] Aug. 30, 1983

[54] CASSETTE HOLDER

[75] Inventor: Toshikazu Kato, Hachioji, Japan

[73] Assignee: Olympus Optical Company Limited, Tokyo, Japan

[21] Appl. No.: 302,376

[22] Filed: Sep. 15, 1981

[30] Foreign Application Priority Data

Sep. 18, 1980 [JP] Japan .............. 55-133610[U]

[51] Int. Cl.³ .............................. G11B 5/008
[52] U.S. Cl. .................................. 360/96.5
[58] Field of Search ........................ 360/96.5

Primary Examiner—George G. Stellar
Attorney, Agent, or Firm—Toren, McGeady and Stanger

[57] ABSTRACT

A cassette holder used for electronic equipments, such as for example a tape recorder, comprises a body of the cassette holder of the slot-in type, a resilient member disposed in the vicinity of the body and having such a toggle action that the resilient member is biased in a large degree toward the cassette insertion when the cassette is loaded, but in a small degree toward the cassette ejection when the cassette is unloaded, and an engaging pin provided to the resilient member and arranged to be engaged with the cassette to be loaded so as to transmit the bias force of the resilient member through the engaging pin to the cassette.

5 Claims, 2 Drawing Figures

CASSETTE HOLDER

BACKGROUND OF INVENTION

1. Field of the Invention

The present invention relates to a cassette holder of the slot-in type, and particularly relates to a cassette holder which enables a tape-cassette to be resiliently loaded thereinto and to prevent the tape-cassette from rushing out when the tape-cassette is ejected therefrom.

2. Description of Prior Art

Heretofore, various kinds of cassette holders have been used. For example, there has been used the cassette holder into which a compact tape-cassette of a small size (which will be hereinunder denoted as "C-cassette") is slidably loaded.

This cassette holder is provided, in the vicinity of the body thereof, with a resilient member, such as for example, a leaf spring which is arranged to allow the C-cassette to be inserted into the body of the cassette holder, and also to push out the C-cassette loaded.

This leaf spring is warped on one side thereof, being held between a pair of holding members which respectively grip the both ends of the leaf spring and are spaced at a distance a little less than the length of the leaf spring. Due to the above construction, the resilient force of the leaf spring is inverted at one position when the leaf spring is pressed toward the opposite side from the side where the leaf spring is initially warped, so that the leaf spring is warped on the opposite side by its bias force. In the middle portion of the leaf spring there is provided an engaging pin arranged to be engaged with the C-cassette so as to cause the associated movement of the latter, in order to allow the C-cassette to be inserted into the body of the cassette holder or to be pushed out, through the inversion of the leaf spring. In such a cassette holder, the actuating stroke of the leaf spring should be relatively large to completely receive the C-cassette in the body of the cassette holder. However, the actuating stroke of the leaf spring is also inevitably large, after the inversion of the leaf spring, so that the C-cassette is disadvantageously repelled and rushes out from the cassette holder, if the displacement of the leaf spring is large during the cassette insertion.

Particularly, in case of a cassette holder using a micro-cassette of a very small size (which is hereinunder denoted as "MC-cassette"), since the degree of the MC-cassette insertion into the cassette holder is relatively small, and since its weight is very light in comparison with the above-mentioned C-cassette, the MC-cassette is liable to rush out, if the actuating stroke of the leaf spring is large.

SUMMARY OF THE INVENTION

An object of the present invention is to eliminate the above-mentioned disadvantage experienced in the conventional cassette holder.

Another object of the present invention is to provide a cassette holder in which a cassette is easily loaded thereinto, and is prevented, when it has been loaded, from rushing out upon the ejection of the cassette.

Therefore, according to the present invention, there is provided a cassette holder of the construction having a body of the cassette holder of the slot-in type allowing a cassette to be slidably loaded thereinto; a resilient member disposed in the close vicinity of the body, for performing such a toggle action that the resilient member is biased in a large degree toward the direction of the insertion when the cassette is loaded, but in a small degree toward the direction of the removal when the cassette is ejected; and an engaging pin provided to the resilient member and arranged to be engaged with the cassette, thereby to transmit the bias force from the resilient member to the cassette.

In one preferred embodiment of the present invention the resilient member includes a leaf spring, a subsidiary resilient member attached to the substantially middle portion of the leaf spring and arranged to restrain the bias force in one direction of the leaf spring, and a pair of spring members for holding both ends of the leaf spring.

In another embodiment of the present invention, the resilient member comprises a leaf spring having a bias force in one direction larger than that in another direction.

DESCRIPTION OF THE PREFERRED EMBODIMENT

Figure 1:
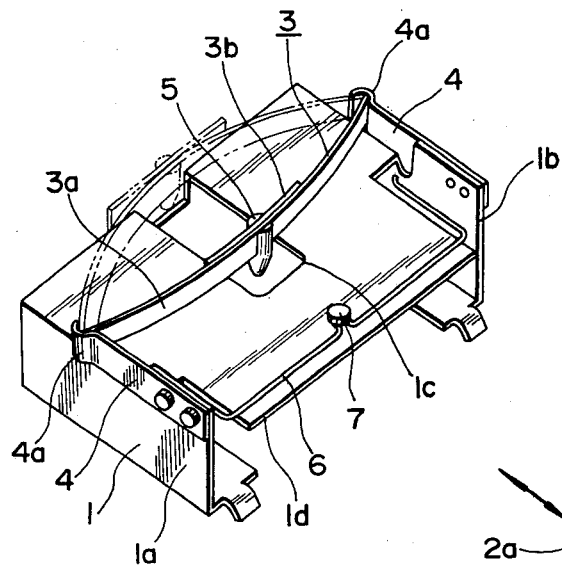
FIG. 1 is a perspective view illustrating a cassette holder in one embodyed form together with a cassette.
Figure 1:
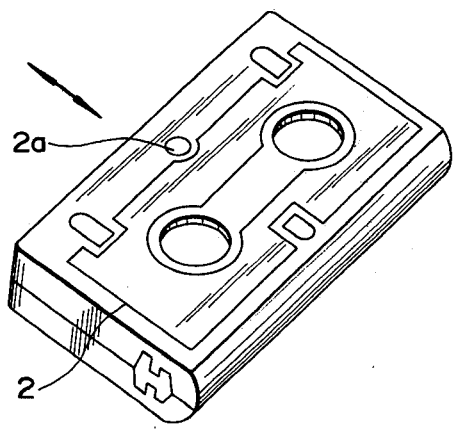

FIG. 1 shows one embodiment of the present invention applied to a micro-cassette tape recorder of the slot-in type.

Referring to FIG. 1, the reference numeral 1 designates a body of the cassette holder for receiving a mircocassette 2 from the front thereof, having a top surface adjacent to which provided is a resilient member 3 having a toggle action such that the resilient member 3 is biased in a large degree toward the direction of the cassette insertion, but in a small degree toward the direction of the cassette ejection. A pair of hold springs 4, 4 having recess portions 4a, 4a formed in the free ends thereof, are attached to both side surfaces 1a, 1b of the body 1 in the opposite relation. These recess portions 4a, 4a of the pair of the hold springs 4, 4 hold therebetween a strip of a leaf spring 3a of the resilient member 3 having a length slightly less than the width of the body 1. In the substantially middle portion of the leaf spring 3a a subsidiary resilient member such as for example a subsidiary leaf spring 3b is secured at its center portion so that the bias force of the leaf spring 3a is restrained in the direction of the cassette ejection. At the center of the resilient member 3 a columnar engaging pin 5 is secured in the vertical direction. Further, in a portion corresponding to the engaging pin 5 the body 1 defines a rectangular opening portion 1c therein, along which the engaging pin 5 is slidable. In the vicinity of an insertion opening 1d a retaining spring 6 is mounted on the body 1. The retaining spring 6 is arranged to retain the cassette 2 loaded, and which is formed from a resilient wire by bending the latter. The retaining spring 6 is secured in its middle portion to the body 1 with a screw 7, while both ends of the retaining spring 6 are disposed in a pair of notch portions formed in the body 1 so that the retaining spring is possible to contact with the cassette loaded.

Figure 2:
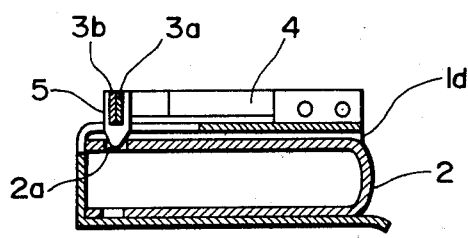
FIG. 2 is a cross-sectional view of the cassette holder shown in FIG. 1, in which the cassette is loaded.

Next, an operation of this preferred embodiment will be explained. When the cassette 2 is inserted through the insertion opening 1d of the body 1, the engaging pin 5 is first engaged with a hole 2a formed in the side of the magnetic head insertion window of the cassette 2. With holding this engagement, when the cassette 2 is further inserted, an insertion force applied to the cassette 2 for the insertion is transmitted to the resilient member 3 through the engaging pin 5, causing the resilient member 3 to be pressed in the direction of the cassette insertion. Then the leaf spring 3a of the resilient member 3 reverses, the inherent bias force when the cassette 2 has come to a predetermined position where the engaging pin 5 reaches on the line passing through both recess portions 4a, 4a of the hold springs 4, 4, while both ends of the subsidiary leaf spring 3b secured to the leaf spring 3a come off from the surface of the leaf spring 3a. Therefore, the bias force of the subsidiary spring 3b is relieved from the leaf spring 3a. Then the leaf spring 3a is warped toward the direction of the cassette insertion on the side of the magnetic head mechanism in a great extent by the repulsive force of the leaf spring 3a itself, as shown in two-dotted line in FIG. 1. With the bias force of the leaf spring 3a and through the engaging pin 5 the cassette 2 is pulled into the inside of the body 1 as shown in FIG. 2, and pressed against the magnetic head mechanism (not shown) by a suitable pressing force.

When the cassette 2 loaded is ejected, the resilient member 3 is pushed at the substantially middle portion in the direction of the cassette ejection (toward the insertion opening 1d) by means of an ejection mechanism (not shown) having an ejection lever to which an operating force is exerted, so that the operating force is transmitted to the cassette 2 through the engaging pin 5. The ejection lever pushes the center of the leaf spring 3a which therefore reaches on the line passing through both recess portions 4a, 4a of the hold springs 4, 4 so that the leaf spring 3a reverses the inherent bias force. Simultaneously, both ends of the subsidiary leaf spring 3b attached to the middle portion of the leaf spring 3a abuts the surface of the latter and restrain the bias force of the leaf spring 3a through the resilient force of the subsidiary leaf spring 3b, resulting that the displacement of the leaf spring 3a becomes less in comparison with when the subsidiary leaf spring 3b does not restrain the bias force of the leaf spring 3a. Therefore, the cassette 2 is moderately pushed toward the insertion opening 1d.

With the above-mentioned constructions, when the cassette 2 is loaded into the body 1 of the cassette holder, the resilient member 3 is easily inverted in a small drive stroke with the cassette 2 being pulled into the cassette holder to a great extent by a large actuating stroke of the resilient member 3. Further, when the cassette is ejected from the body 1, because of the inversion of the resilient member 3 the cassette 2 is pushed out in a small actuating stroke of the resilient member 3, even if a large drive stroke is exerted. Therefore, the cassette 2 can be surely and easily loaded in the body 1, and also can be moderately pushed out without the disadvantage experienced in the conventional cassette holder, in which the cassette 2 rushes out from the inside of the body 1.

Although the present invention has been described in considerable detail with respect to a preferred embodiment thereof, it will be apparent that the present invention is capable of numerous modifications and variations apparent to those skilled in the art without departing from the spirit and scope of the present invention. For example, in the embodiment explained above, the resilient member having a toggle action is constructed in such that a strip of a leaf spring is retained at its both ends by a pair of hold springs and is provided with a subsidiary leaf spring in order to restrain the bias force of the leaf spring. However, the present invention is not limited in the above construction. It is within the scope of the present invention to use a resilient member having such a toggle action that any difference is appreciated between the drive stroke and the actuating stroke, for example, to use a toggle spring biasing itself to a great extent in one direction.

What is claimed is:

1. A cassette holder comprising: a body of the cassette holder of the slot-in type into which a cassette is slidably loaded; a resilient member disposed in the vicinity of said body and having a toggle action such that the resilient member is biased in a large degree toward the direction of the cassette insertion when the cassette is loaded, but in a small degree toward the direction of the cassette ejection when the cassette is ejected; and an engaging pin provided to said resilient member and arranged to be engaged with the cassette so as to transmit the bias force from said resilient member to the cassette.

2. A cassette holder as claimed in claim 1, wherein said resilient member comprises a leaf spring; a subsidiary resilient member attached to the substantially middle of said leaf spring, for restraining in one direction the resilient force of said leaf spring; and a pair of hold spring members for holding said leaf spring at both ends thereof.

3. A cassette holder as claimed in claim 1, wherein said resilient member comprises a leaf spring having a bias force in one direction larger than that in the other direction.

4. A cassette holder as claimed in claim 1, wherein said body comprises a top surface defining in a portion corresponding to said engaging pin an opening portion along which said engaging pin is movable.

5. A cassette holder as claimed in claim 1, wherein said body defines notch portions therein, and said cassette holder further comprises a retaining spring for resiliently retaining the cassette, said retaining spring being mounted on said body with both ends of said retaining spring being disposed in said notch portions.

* * * * *